Feb. 18, 1936.   G. S. LOREE   2,031,272
MILK BOTTLE RECEPTACLE
Filed June 13, 1935   4 Sheets-Sheet 1
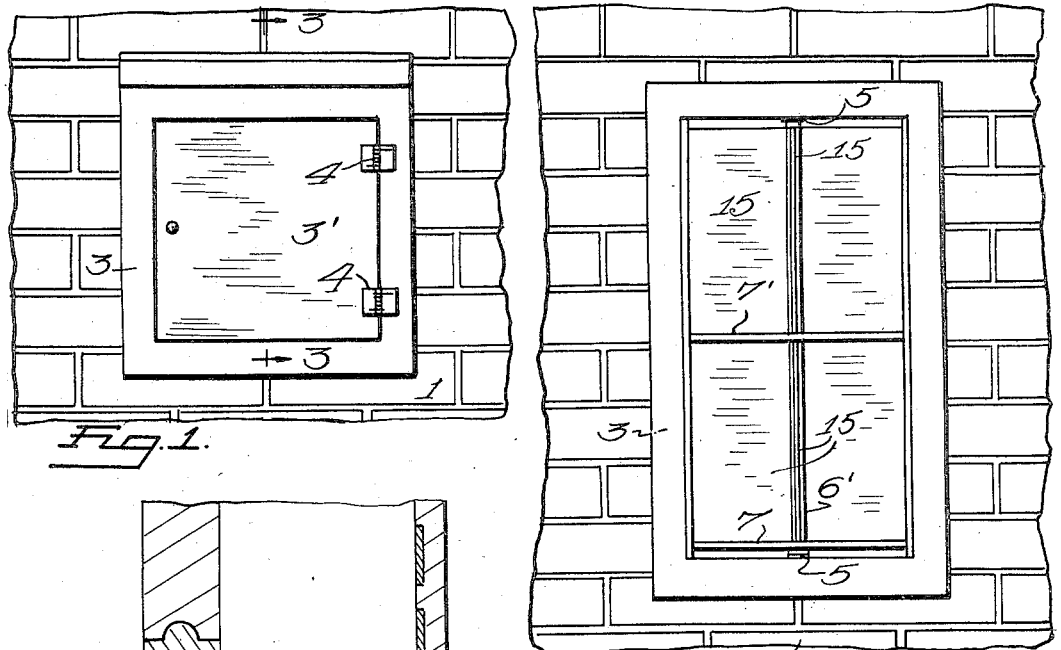
Fig.1.
Fig.2.
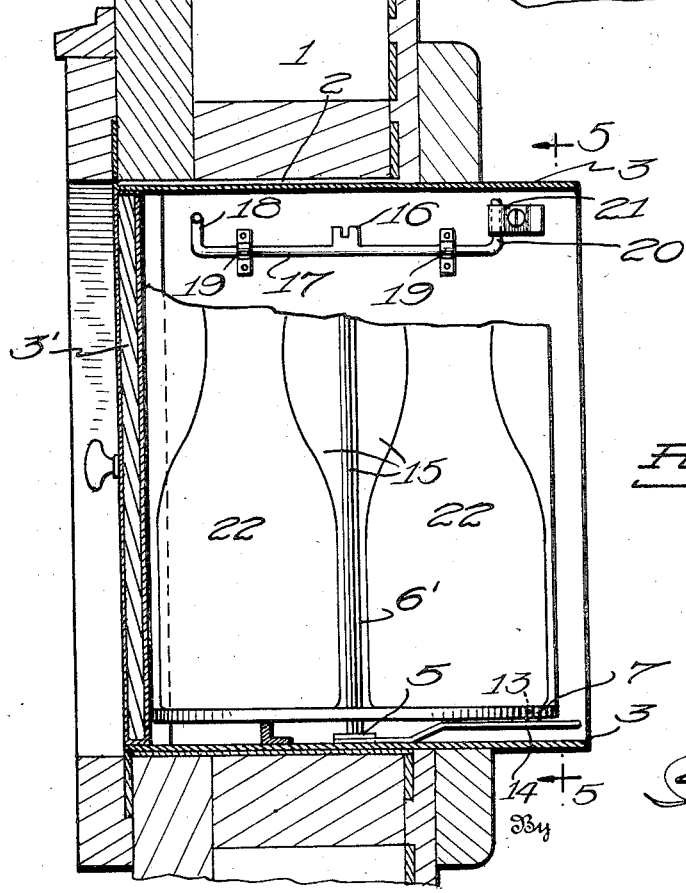
Fig.3
G. S. Loree, Inventor
Attorney Feb. 18, 1936.  G. S. LOREE  2,031,272
MILK BOTTLE RECEPTACLE
Filed June 13, 1935    4 Sheets-Sheet 2

Inventor
G. S. Loree
By
Attorney

Feb. 18, 1936.                G. S. LOREE                2,031,272
                         MILK BOTTLE RECEPTACLE
                       Filed June 13, 1935        4 Sheets-Sheet 3
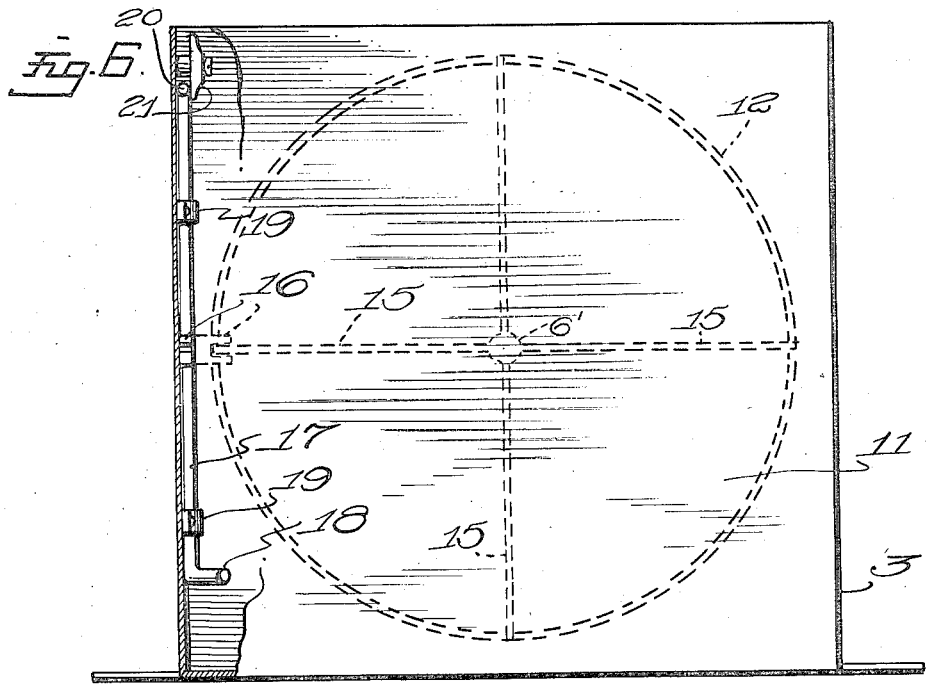
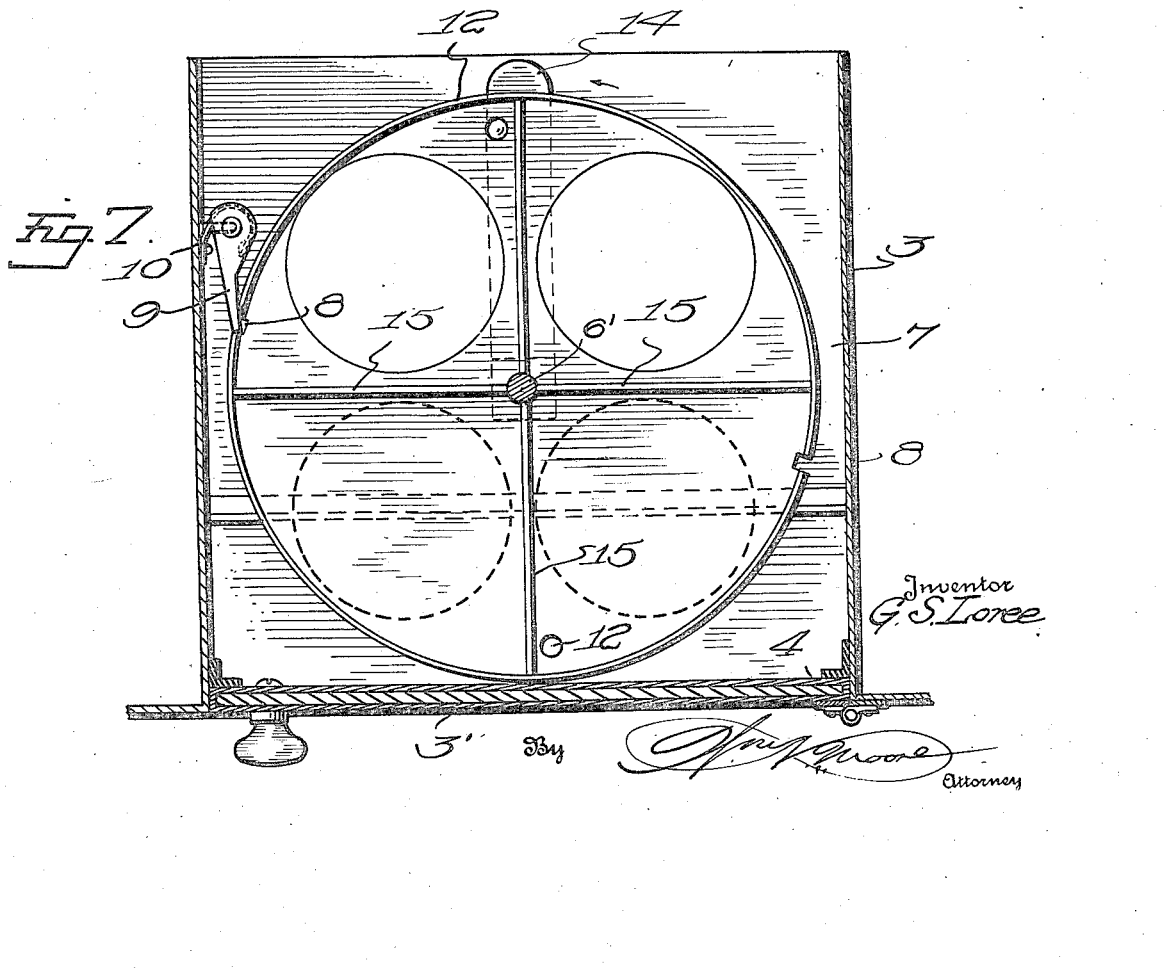

Feb. 18, 1936. G. S. LOREE 2,031,272
MILK BOTTLE RECEPTACLE
Filed June 13, 1935 4 Sheets-Sheet 4
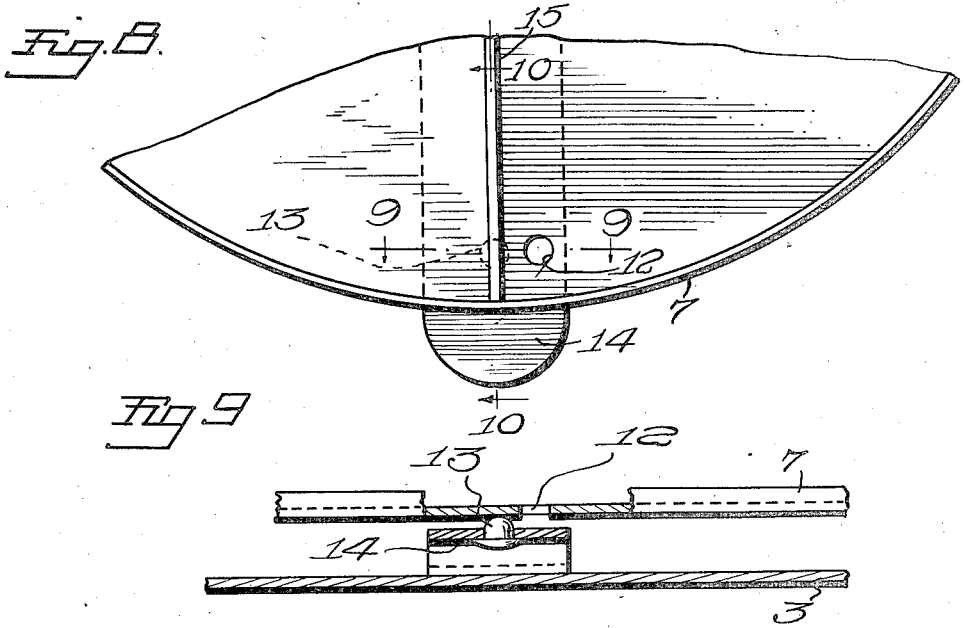
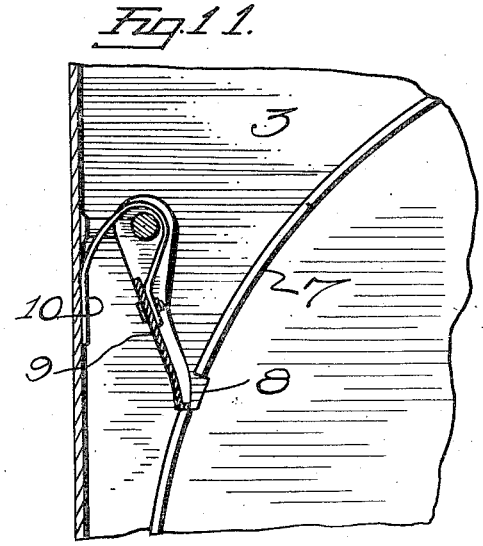

Patented Feb. 18, 1936

2,031,272

UNITED STATES PATENT OFFICE 2,031,272

MILK BOTTLE RECEPTACLE

George S. Loree, Hornell, N. Y., assignor to Francis J. Loree, Hornell, N. Y.

Application June 13, 1935, Serial No. 26,505

3 Claims. (Cl. 232—41)

My invention relates to improvements in milk bottle receptacles, and one object of my invention is a product of the character stated which will protect the liquid against damaging influence of the weather and which will also prevent theft of the milk and thus prove a most desirable and useful invention.

Another object of my invention is the provision of a milk bottle receptacle which will be built in and form a part of the structure or building, and thus make the invention very desirable for use in homes, apartments, or any character of structure where it would be used.

Another object of my invention is the provision of a milk bottle receptacle which will be of ornamental and attractive appearance and not mar the general appearance of the building in which it is installed and which will be capable of receiving any number of bottles desired.

Another object of my invention is the provision of a milk bottle receptacle which will be of simple, durable and inexpensive construction to make its use necessary and which will be thoroughly efficient and practical in every particular.

With these objects in view my invention consists of a milk bottle receptacle embodying novel features of construction and combination of parts, substantially as described and claimed and as shown in the accompanying drawings, in which:

Figure 1 represents a front view or elevation of my milk bottle receptacle in position in a building or structure.

Figure 2 represents a similar view showing a form of my invention to accommodate a double number of milk bottles, the door of the receptacle being removed.

Figure 3 represents a sectional view taken on line 3—3 of Figure 1.

Figure 6 represents a top plan view.

Figure 7 represents a top plan view with the top plate removed.

Figure 8 represents an enlarged detail view of a portion of the turn table or rotary member and the flat spring locking plate.

Figure 9 represents a sectional view taken on line 9—9 of Figure 8.

Figure 10 represents a sectional view taken on line 10—10 of Figure 8, and

Figures 11 and 12 are detail views of the spring detent or ratchet mechanism for locking the turn table or rotary member.

Referring by numeral to the drawings in which the same numbers of reference denote the same parts in all the views:

Figure 4:
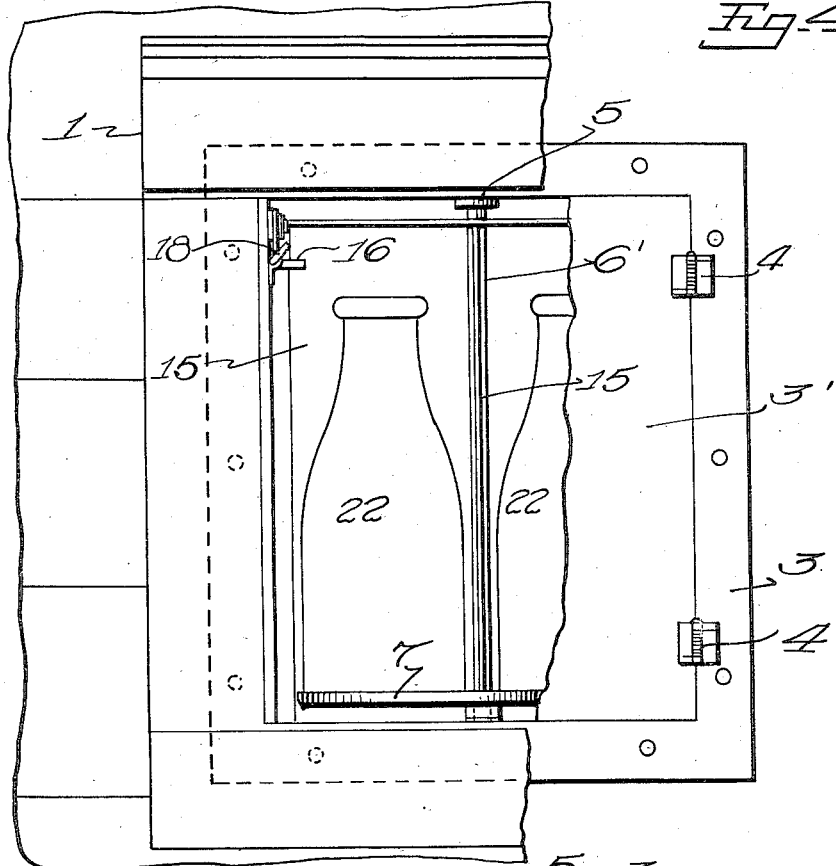
Figure 4 represents a front view partly broken away to show details.
Figure 5:
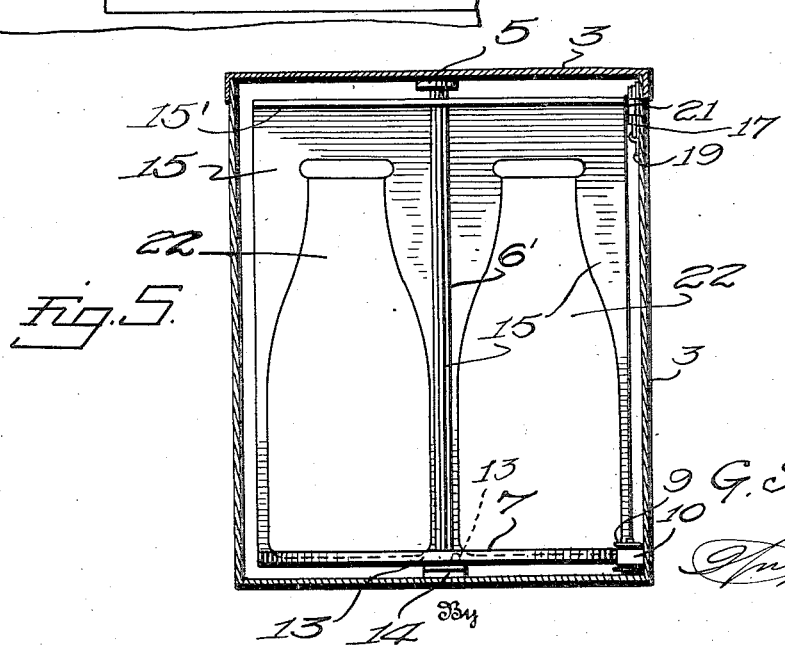
Figure 5 represents a sectional view taken on line 5—5 of Figure 3.

The numeral 1 designates the wall of a structure or building provided with the opening 2, which extends through the wall and in which fits and is secured the box or casing 3, of my receptacle, and in the open front of the casing is the door or closure 3', connected to the casing by the spring hinges 4.

From this construction it will be noted that the casing is in the form of an open box with the front closed by the spring hinges, and secured to the upper and lower walls of the casing are the cupped bearing plates 5, in which are placed the balls 5', forming bearings for the upper and lower cupped ends 6, of the shaft 6', upon which is mounted near the lower ends of said shaft the flanged turn table or rotary member 7, and the upper or top plate 7'.

From this construction it will be noted that the turn table or rotary member can be easily turned upon the shaft, and said turn table is provided at opposite edges with the recesses 8, adapted to be engaged by the pivoted dog or detent 9, retained in locked position by the flat spring 10, as shown most clearly in Figures 7, 11 and 12, and which acts to lock the turn table and prevent unlawful removal of the filled bottles of milk.

In order to hold the turn table or rotary member in proper location I provide said turn table with an opening 12, adapted to be engaged by the lug 13, carried by the flat spring plate 14, held in place upon the lower wall of the box or casing, as shown in Figures 9 and 10.

It will be understood that the lug on the flat spring plate engages the opening in the turn table and serves to keep the table in proper place, but does not lock the plate against rotation, while the spring detent serves to lock the turn table from improper turning, and thus prevents access to the filled bottles of milk after their being placed on the turn table, and the turn table is provided with the series of division plates 15, as seen in Figures 6 and 7, which thus provide compartments to receive the milk bottles 22.

I also provide a further means to lock the turn table, which consists of the bifurcated ear 16, which engages the edge of one of the division plates 15, as shown in Figures 3 and 6, and this ear is on the shaft 17, having a handle 18, and mounted in bearings 19, and having a bent end 20, retained by the clip 21, as shown in Figure 3.

The operation of my milk bottle receptacle will be readily understood from the drawings taken in connection with the description, and the full bottles of milk are placed upon the turn table or rotary member and the table turned to place the filled bottles at the inner end of the casing and within the building, in which position the spring detent locks the table, and at the same time the empty bottles are delivered at the front end of the casing and are removed.

It will be understood that my receptacle may be made to receive any number of bottles by increasing the length of the shaft and as shown in Figure 2, using the pair of turn tables or rotary members 7 and 7', and if desired the turn tables may be moved on the shaft to receive bottles of different sizes, as may be found necessary.

It will be evident that the empty bottles are readily accessible for removal by the milkman, and that the full bottles are brought into the building where the heat prevents the milk from freezing, and also the turn table is retained by the series of locking means to absolutely make it impossible to steal the milk.

I have described my invention for use as a milk receptacle, but it will be evident that it could be used to receive and deliver packages or bundles of any character where safety and protection from the weather are required, and it will be apparent that my invention will prove useful, practical and efficient in every respect.

I claim:

1. A structure of the character and for the purpose described, comprising a casing or housing, a shaft rotatably mounted in said casing, a turn table or rotary member mounted on said shaft and adapted to receive articles for delivery, a series of division walls or plates carried by said turn table and providing compartments, a shaft mounted in the casing and having a bifurcated ear to engage the upper edge of said plates to retain the turn table, a flat spring plate in the lower portion of the casing to engage the underside of said turn table, and a spring detent mechanism to engage the edge of the turn table or rotary member and retain the rotary member against improper rotation.

2. A structure of the character and for the purpose stated, comprising a casing or housing, a shaft rotatably mounted in said casing, a turn table or rotary member carried by said shaft and adapted to receive articles for delivery, a series of division plates mounted on said table, a shaft mounted in the upper portion of the casing and having a bifurcated ear to engage one of said plates to hold the turn table, an opening in said turn table, and a flat spring plate having a lug adapted to spring into said opening to retain said turn table.

3. A structure of the character and for the purpose described, comprising a casing adapted to fit a through opening in the wall of a building, a vertical shaft rotatably mounted in said casing, a turn table on said shaft, a top plate on said shaft, division plates between the turn table and top plate forming compartments to receive articles for delivery, a shaft carrying a latch to engage one of the said division plates, a spring detent to engage the edge of the turn table, an opening in said turn table, and a flat spring plate having a lug to engage said opening, thus providing a series of means for locking said turn table.

GEORGE S. LOREE.